MICRO-ELECTRONIC FORM MASKING SYSTEM

Filed Jan. 12, 1966

INVENTORS,
WILLIAM B. GLENDINNING
SIDNEY MARSHALL
BY Harry M. Saragovitz,
Edward J. Kelly, Herbert Berl
& Julian C. Keppler ATTORNEYS United States Patent Office 3,422,442

Patented Jan. 14, 1969

3,422,442

MICRO-ELECTRONIC FORM MASKING SYSTEM

William B. Glendinning, Belford, and Sidney Marshall, Neptune, N.J., assignors to the United States of America as represented by the Secretary of the Army Filed Jan. 12, 1966, Ser. No. 520,829
U.S. Cl. 346—107 1 Claim
Int. Cl. G01d 9/42; H04n 5/84

ABSTRACT OF THE DISCLOSURE

A device for the production of photographic masks utilized in the fabrication of microelectric circuits. The device utilizes a defined pencil of light for writing on a high resolution photographic plate which is exposed in a format, by controlled movement of the plate and a shutter intermediate the plate and the light source.

Figure 1:
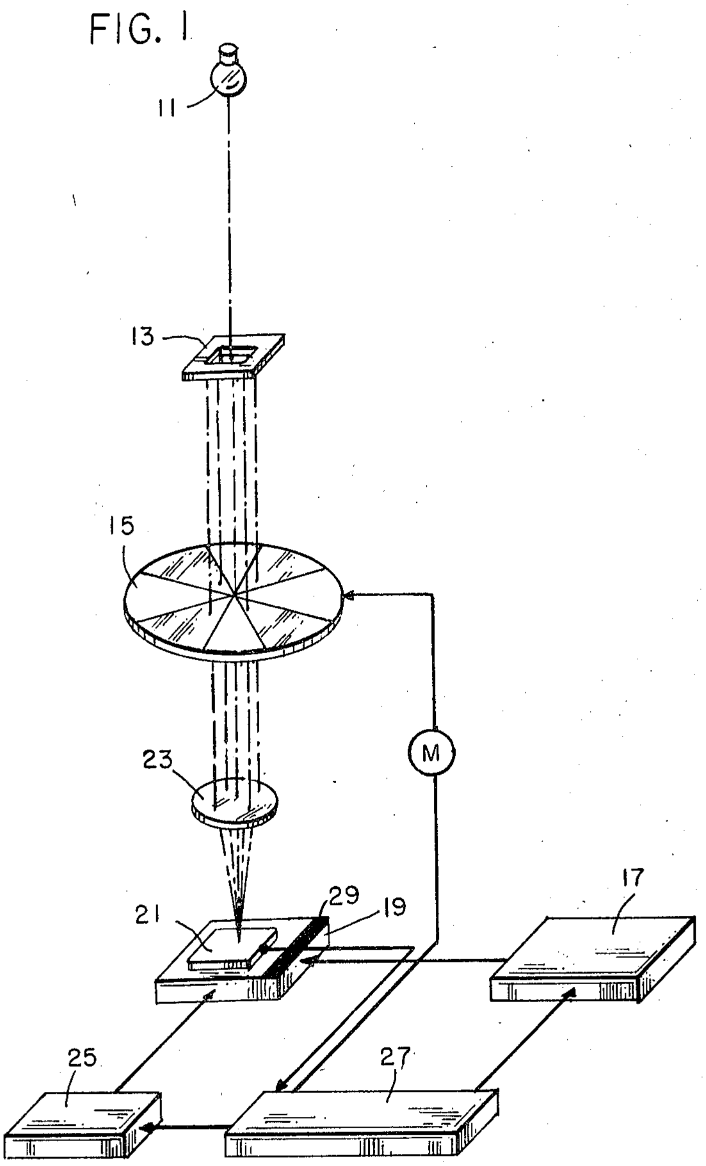

The present invention relates to an improved, new and novel means and method for the rapid production of photographic masks that are utilized in the fabrication of microelectronic circuits.

Much use has been made by the electronics industry of photosensitive emulsions in the fabrication of items such as printed circuit boards, planer diffused silicon transistors, diodes and integrated micro-circuits. Photosensitive emulsions have also been used for producing large quantities of film resistors, capacitors, and some film inductors. In addition, photosensitive emulsion, techniques have been used extensively in providing packaging schemes for use in microelectronic fabrication.

Most of the prior art to date in using photosensitive emulsions for the purposes described above has taken the form of the conventional contact printing technique such as the contact printing that has been used extensively in every day photography. The contact printing method consists of an exposure procedure in which a photo image is caused to activate a thin photosensitive emulsion which has been applied to the surface of a substrate. In this procedure an image-forming photo mask is placed directly upon the substrate surface. A light flux of uniform intensity is used to transfer image information from the photo mask to the photosensitive emulsion. After wet chemical development, the emulsive coating can be used as a process mask for various deposition and etching operations.

Besides the development of the utilization of photosensitive emulsions for process masking material, some techniques have been concerned with the development for the means of constructing photo masks from photosensitive emulsive material in the form of photographic film or plates. With respect to the work area of photo-mask fabrication, especially in the field of microelectronics, the process begins in the drafting room. The draftsman lays out some geometric pattern using a scale-up factor of say 200 times. The original drawing is photographed and reduced in a two-step process which results in a photo-mask. The mask is used in a process such as described in the paragraph above.

Accordingly, the primary object of the preent invention is to provide an improved automatic microcircuit photomask-making technique and means to accomplish the same.

Important features in the practice of the invention herein reside in the elimination of expensive drafting work such as described above; makes possible simple localized process-mask-making; reduction in volume and cost of equipment; and permits greater versatility in revising photo-masks and process masks.

The objectives of the present invention are accomplished by a means and method which employs an optical projection technique to obtain a precisely defined pencil of light which is used for "writing" on a high resolution photographic plate. The photo-mask geometry is exposed in a raster-like format by accurate servo controlled translation of the high resolution plate with respect to the projected light beam and by contorlled automatic shuttering, such as by a relay arrangement, employed in conjunction with the operation of the servomechanism.

Figure 2:
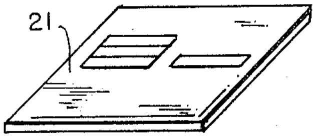

The invention can best be understood from the following description to be read in view of the accompanying drawing in which:

FIG. 1 is a schematic view of one embodiment of the photo-mask-making system of the present invention, and FIG. 2 is a view in perspective of a representative mask made in accordance by the system herein described.

Reference is now male to FIG. 1 which shows an optical projection system by means of which a small sharply defined pencil of light is brought into focus on the sensitized surface of a high resolution photographic plate. The system includes a light source 11 which can be of incandescent or mercury source. Spaced from the light source 11 is a foil mask 13 which contains a small square aperture, as shown, and which serves to control the shape of the light beam passing through it. In one application, the aperture in the mask 13 is a square of .050" by .050". Spaced from and in axial alignment with the mask 13 is a relay controlled shutter 15 driven by a motor mechanism M which in turn is controlled by a master programmer shown at 27, the operation of which will be hereinafter described. In the specific embodiment shown the shutter 15 comprises an eight sector wheel including alternate opaque and transparent sectors.

In alignment with the shutter 15 is a movable plate holder 19 upon which may be mounted the high resolution photographic plate 21 upon which the master mask is fabricated. Intermediate the plate 21 and the shutter 15 is an objective lens 23 which serves to pin point the beam of light onto the plate 21 after its passage from the shutter 15.

Movement of the holder 19 and the photographic plate 21 thereon in either the X or Y axis, or both, is accomplished by separate micropositioners 17 and 25. As shown on the drawing, the positioners 17 and 25 are individually linked to the programmer 27 and similarly linked to the plate holder 19. In the system herein shown, the positioner 17 serves to move the plate along the X axis, and the positioner 25 along the Y axis. Attached to the upper surface of the plate holder is a photosensitive light detector 29, such as a light sensitive semiconductor element.

In the operation of the system herein described, a beam of light projected through the lens 23 will actuate the light detector 29 and in turn initiate the programmer 27. The several stages of operation of the several components of the system will then be synchronously set up, i.e., control of the exposure time of the photographic plate by controlled sequence of the rotational speed of the shutter 15. Such rotational speed of the shutter in turn corresponds with the direction and speed of movement of the plate holder 19 and the high resolution photographic plate 21 affixed thereon by action of the micropositioners 17 and 25. The informational data to provide such operation of the micropositioners 17, 25, and the shutter 15 can, for example, be provided on coded punched tape within the programmer 27.

What is claimed is:

1. A system for the production of mask patterns utilized in the fabrication of integrated circuits which includes a light source, a mask for shaping a beam of light from said light source to a desired pattern, a shutter having alternate opaque and transparent sectors in axial alignment with said mask, a high resolution photographic plate positioned to receive the beam of light from and through a transparent sector of said shutter and further including means for moving said photographic plate in either its X or Y axis or both, wherein said last mentioned means includes a light actuated master control element positioned adjacent to said photographic plate for synchronously controlling movement of said plate and shutter for generating mask patterns having finely defined corner edges.

References Cited

UNITED STATES PATENTS

| | | | |
|---|---|---|---|
| 3,004,469 | 10/1961 | Broyer | 88—24 |
| 3,247,761 | 4/1966 | Herreman et al. | 88—24 |

NORTON ANSHER, *Primary Examiner.*

W. A. SILVERTSON, *Assistant Examiner.*

U.S. Cl. X.R.

95—1; 178—6.7; 355—68